United States Patent [19]

Adkisson et al.

[11] Patent Number: 5,257,282
[45] Date of Patent: Oct. 26, 1993

[54] HIGH SPEED CODE SEQUENCE GENERATOR

[75] Inventors: Willis B. Adkisson; Glen D. Rattlingourd, both of Salt Lake City; Billie M. Spencer, Bountiful; John W. Zscheile, Jr., Farmington, all of Utah

[73] Assignee: Unisys Corporation, Blue Bell, Pa.

[21] Appl. No.: 625,497

[22] Filed: Jun. 28, 1984

[51] Int. Cl.[5] .............................................. H04L 9/00
[52] U.S. Cl. .......................................... 375/1; 380/46; 364/717
[58] Field of Search ................. 364/717; 178/22.16; 328/60, 61; 375/1; 380/46

[56] References Cited

U.S. PATENT DOCUMENTS

| | | | |
|---|---|---|---|
| 3,295,065 | 12/1966 | Brown | 328/60 |
| 3,665,314 | 5/1972 | Leuthold | 328/61 |
| 3,691,472 | 9/1972 | Bohman | 328/61 |
| 4,115,657 | 9/1978 | Morgan | 364/717 |
| 4,225,935 | 9/1980 | Zscheile, Jr. et al. | 364/717 |
| 4,320,513 | 3/1982 | Lampert | 364/717 |
| 4,325,129 | 4/1982 | Groth, Jr. | 364/717 |
| 4,450,321 | 5/1984 | Quigley et al. | 364/717 |
| 4,493,046 | 1/1985 | Watanabe | 364/717 |

FOREIGN PATENT DOCUMENTS

| | | | |
|---|---|---|---|
| 3339985 | 5/1985 | Fed. Rep. of Germany | 364/717 |
| 622091 | 7/1978 | U.S.S.R. | 364/717 |
| 744529 | 6/1980 | U.S.S.R. | 364/717 |
| 1108614 | 8/1984 | U.S.S.R. | 364/717 |

Primary Examiner—Salvatore Cangialosi
Attorney, Agent, or Firm—John B. Sowell; Mark T. Starr

[57] ABSTRACT

A novel low speed code sequence generator having a set of parallel flip-flops is provided and comprises a vector generator in series between the outputs and the inputs of the set of parallel flip-flops in the generator. The outputs from the low speed code sequence generator may be multiplexed together to provide an individual high speed code sequence. The selective outputs from a plurality of low speed code sequence generators may be algebraically combined and then multiplexed together to provide a composite code sequence.

12 Claims, 3 Drawing Sheets

HIGH SPEED CODE SEQUENCE GENERATOR

BACKGROUND OF THE INVENTION

1. Field of the Invention

The present invention relates to apparatus for generating pseudo random codes at very high speeds. More particularly, the present invention relates to the generation of high speed composite pseudo random codes.

2. Description of the Prior Art

Heretofore, it was known that a plurality of pseudo random (PN) codes could be combined in a manner which would provide a composite PN code whose epoch length or code period is the product of the length of the individual PN codes being combined (see our U.S. Pat. No. 4,225,935). Composite PN codes provided by this system are desirable from the standpoint of acquisition because it is only necessary that the sum of the lengths of the individual codes comprising the composite code be searched. Any person not knowing the specific individual codes must operate on the composite code as if it were a very long epoch individual code. Thus, an unfriendly person not knowing the individual codes would be greatly hindered in acquiring the signal being transmitted.

It is also known in the field of communications that the higher the speed of the code sequence (chip rate), the less likely that the transmitted signal can be jammed and/or intercepted. Thus, it is desirable to transmit at extremely high chip rates to discourage jamming and/or interception. Heretofore, PN code generators have been employed to generate individual PN codes and such code generators have been the limiting factor in the speed of code generation or chip rates. A known high speed PN generator comprises a plurality of D-type flip-flops arranged in a series feedback circuit and having at least one EXCLUSIVE OR gate in the series chain. The speed of such prior art PN code generators have been limited by the type of the semiconductor device technology being employed. As semiconductor device technology improves, the speed of such prior art PN generators can also be increased. Presently, ECL semiconductor devices are representative of fastest commercially available flip-flops.

As the speeds of code generation begin to exceed 80 megahertz frequency rates or chip rates, the interconnect paths of the PN generators approach one quarter wavelength and begin to act as if they were radiating antennas or transmission lines. Such radiating transmission lines create critical problems in establishing the path lengths, in shielding and in impedance matching.

Accordingly, it would be desirable to provide a high speed PN code sequence generator capable of operating at speeds in excess of 80 megahertz without introducing problems of radiating transmission lines in the interconnecting paths of the circuitry and other high speed problems.

SUMMARY OF THE INVENTION

It is a primary object of the present invention to provide a novel high speed code sequence generator for generating a PN spread spectrum code at higher sequence rates than was heretofore possible.

It is another primary object of the present invention to provide a novel high speed code sequence generator for generating a composite PN spread spectrum code at higher sequence rates than was heretofore attainable.

It is another primary object of the present invention to provide a plurality of similar relatively low speed code sequence generators coupled to a plurality of identical algebraic combiners each providing a portion of a composite code at the output which can be combined to provide a high speed code.

It is another object of the present invention to provide a high speed multiplexer coupled to a plurality of algebraic combiners to provide a complete composite high speed code at the output.

It is another object and a feature of the present invention to provide a novel relatively low speed code sequence generator having a parallel set of flip-flops and a vector generator.

It is another object of the present invention to provide a parallel to serial multiplexer or converter combined with a novel relatively low speed code sequence generator to provide a high speed PN code sequence at the output of the multiplexer.

It is yet another object of the present invention to provide a novel high speed composite PN code sequence generator having a minimum amount of high speed logic circuitry.

According to these and other objects of the present invention, a plurality of low speed PN code sequence generators are provided in a parallel array. Each of the generators provides a plurality of outputs indicative of vector states defining a portion of a composite code. The portions of the composite code generated at low speeds are combined into a composite high speed PN code in a high speed multiplexer. A novel low speed code sequence generator having a minimal number of flip-flops and a vector generator are employed to produce the low speed code sequence.

DESCRIPTION OF THE PREFERRED EMBODIMENT

For purposes of this application, the term "composite code" denotes the algebraic combination of a plurality of individual codes which are relatively prime in length.

For purposes of this application, the term "relatively prime in length" indicates that any two lengths of individual codes in a composite code do not contain a common factor or the same prime number.

For purposes of this application, the term low speed and low speed code sequence generators mean frequencies below the level where radiation, shielding, line lengths, impedance matching and set up time of the semiconductor devices start to present design and manufacturing problems. As device technology improves the speed of operation will improve but is now generally in the frequency range of below eighty megahertz.

For purposes of this application, the term high speed and high speed code sequence generators mean frequencies above the low speed frequencies and are usually multiples of the low speed frequencies.

Figure 1:
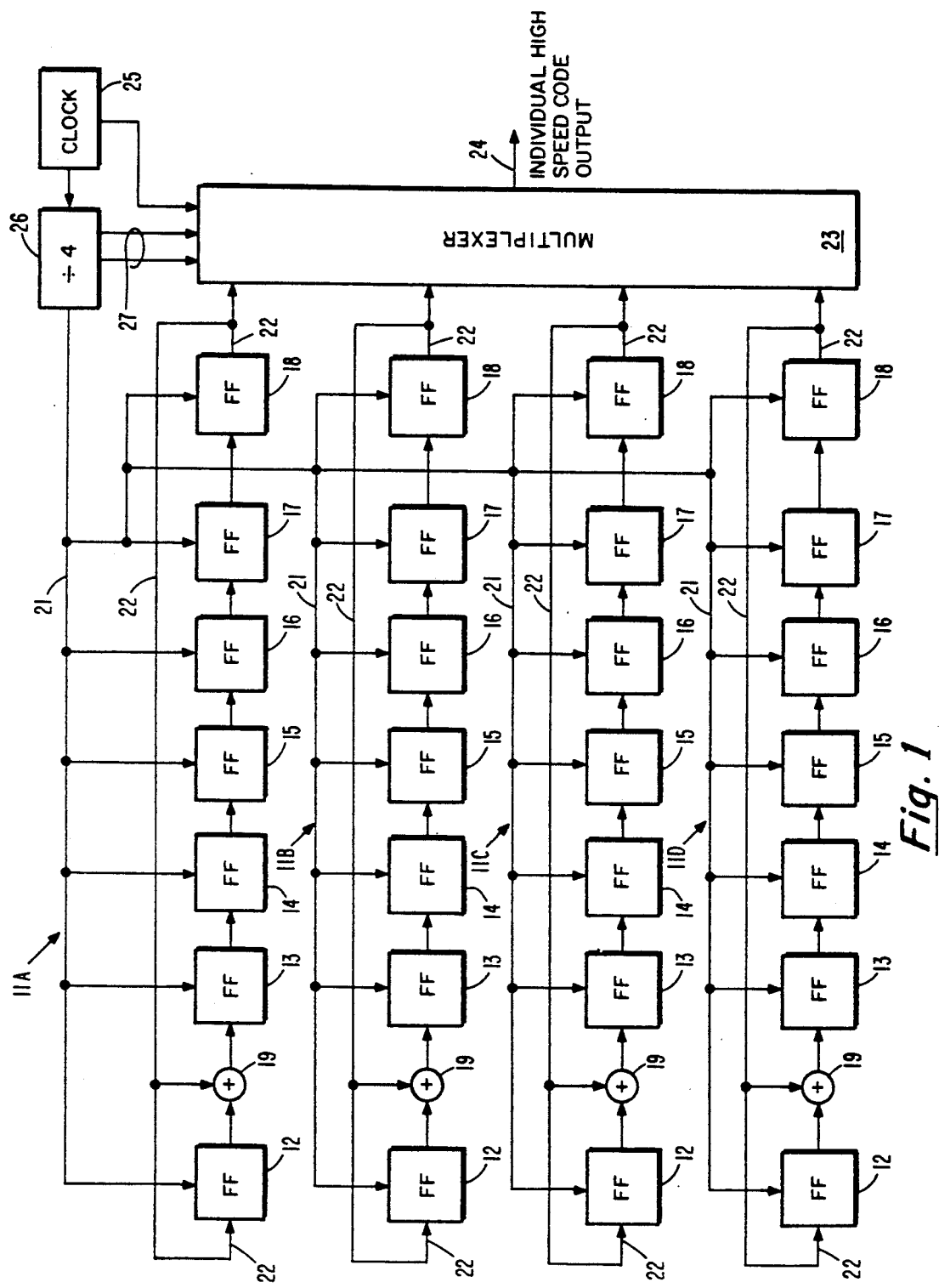
FIG. 1 is a schematic block diagram of a plurality of multiple return shift register generators or low speed PN code sequence generators having their output signals combined to provide an individual high speed PN code sequence output.

Refer now to FIG. 1 showing a multiple return shift register generator 11A. The generator 11A is shown comprising seven flip-flops, 12 to 18 and having an EXCLUSIVE OR gate 19 in series between flip-flip 12 and 13. If the EXCLUSIVE OR gate 19 is placed in a different location in the series of flip-flops, a different code will be generated. Similarly, if a plurality of EXCLUSIVE OR gates 19 are placed between different flip-flops in the series of flip-flops, an entirely different code will be generated.

Clock line 21 is shown connected to the clock input of the flip-flops 12 to 18. The output of flip-flop 18 on line 22 is fed back to the data input of flip flop 12 and to one of the inputs of the EXCLUSIVE OR gate 19. The output of flip-flop 12 is connected to one of the inputs of EXCLUSIVE OR gate 19 and the output of EXCLUSIVE OR gate 19 is connected to the data input of flip-flop 13. The remaining flip-flops are connected in series having the Q output of the preceeding flip-flop connected to the data input of the next following flip-flop so as to form a multiple return shift register generator. A plurality of multiple return shift register generators 11B, 11C and 11D are identical to the shift register generator 11A and have their outputs 22 connected to a multiplexer 23 which performs the function of parallel to series conversion to provide an individual high speed code output on line 24. High speed clock 25 is down converted by a divide by four circuit 26 to provide the relatively low speed clock for the multiple return shift register generators 11 and is also provided with a pair of binary lines 27 connected to the multiplexer 23 for recombining the relatively low speed outputs on lines 22 into a high speed output on output line 24. It will be understood that the high speed clock 25 is preferably stepped down by the number of multiple return shift register generators being utilized in the system to produce the high speed code output. This will permit the multiplexer to combine the low speed codes without overlap.

The D-type flip-flops 12 to 18 require a large number of interconnect lines which could generate radiation problems to be discussed in more detail hereinafter. Further, D-type flip-flops require set up time of the data input prior to being clocked through the flip-flop by the clock signals on line 21. Multiplexers similar to multiplexer 23 are commercially available which require very little set up time and substantially less set up time than the flip-flops 12 to 18. High speed clock similar to clock 25 are commercially available which will operate faster than the logic employed in the flip-flops and multiplexer 23. Thus, the limiting factor for speed of operation of the multiple return shift register generator 11 is the specified set up and operating time for the flip-flops 12 to 18.

While it is technically feasible to multiplex an unlimited number of multiple return shift register generators 11 with a high speed multiplexer 23, in the preferred embodiments of the present invention it is desirable to multiplex either 4, 8 or 16 multiple return shift register generators 11.

As will be explained hereinafter, the individual high speed code being produced on line 24 can be combined with other different high speed codes of different lengths to produce high speed composite codes.

Figure 2:
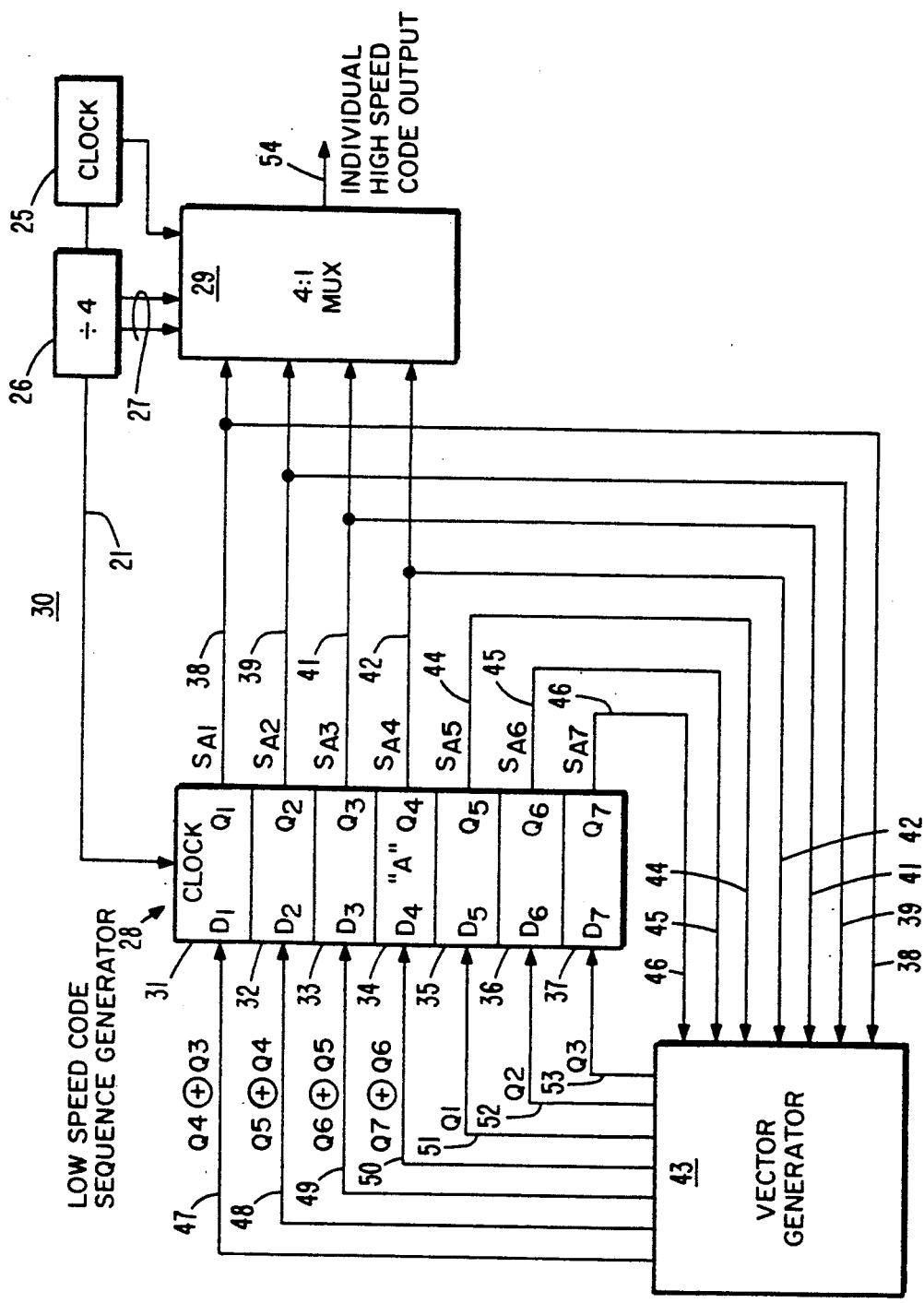
FIG. 2 is a schematic block diagram of a preferred embodiment low speed PN code sequence generator comprising a minimum number of flip-flops and a vector generator having the output signals combined to provide the equivalent high speed PN code output signal as shown in FIG. 1.

Refer now to FIG. 2 showing a schematic block diagram of a preferred embodiment code sequence generator capable of producing the same individual high speed code output as the system shown in FIG. 1. The high speed code sequence generator 30 shown in FIG. 2 comprises a low speed code sequence generator 28 having seven D-type flip-flops 31 to 37. The outputs from flip-flops 31 to 34 on lines 38, 39, 41 and 42 are applied to the high speed multiplexer 29 and are also recirculated back to the inputs of the flip-flops via a vector generator 43. Further, the output from flip-flops 35 to 37 on lines 44 to 46 are also recirculated back to the input of the flip-flops via vector generator 43. The logic function of the vector generator 43 for purposes of this explanation has been designed to produce the identical code sequence as the output shown on line 24 of FIG. 1. The signal on line 47 to the data input of flip-flop 31 is shown as the $Q_4$ output signal EXCLUSIVE ORed with the $Q_3$ output signal. The $Q_1$ to $Q_7$ output signals from the flip-flops of low speed code sequence generator 28 are shown on lines 47 to 49 and 50 to 53 after leaving vector generator 43. The signals shown produce the identical individual high speed code output on line 54 as that shown on output line 24 of FIG. 1. In the preferred embodiment of FIG. 2, the high speed clock 25, the divide by four circuit 26 and the binary clock lines 27 are identical to those shown in FIG. 1 and have been numbered the same.

It will be noted that in the preferred embodiment of FIG. 2, only seven D-type flip-flops are required in the low speed code sequence generator 28 and only four EXCLUSIVE OR gates are required in the vector generator 43. By comparison, the low speed code sequence generators 11 in FIG. 1 requires 28 flip-flops and four EXCLUSIVE OR gates. The length of the code sequence of the sequence generators shown in FIGS. 1 and 2 is $2^7-1$ or one hundred twenty-seven chips in epoch length. It will be understood that if the epoch length of the sequence is increased, a greater savings in hardware is realized by the preferred embodiment of FIG. 2.

Figure 3:
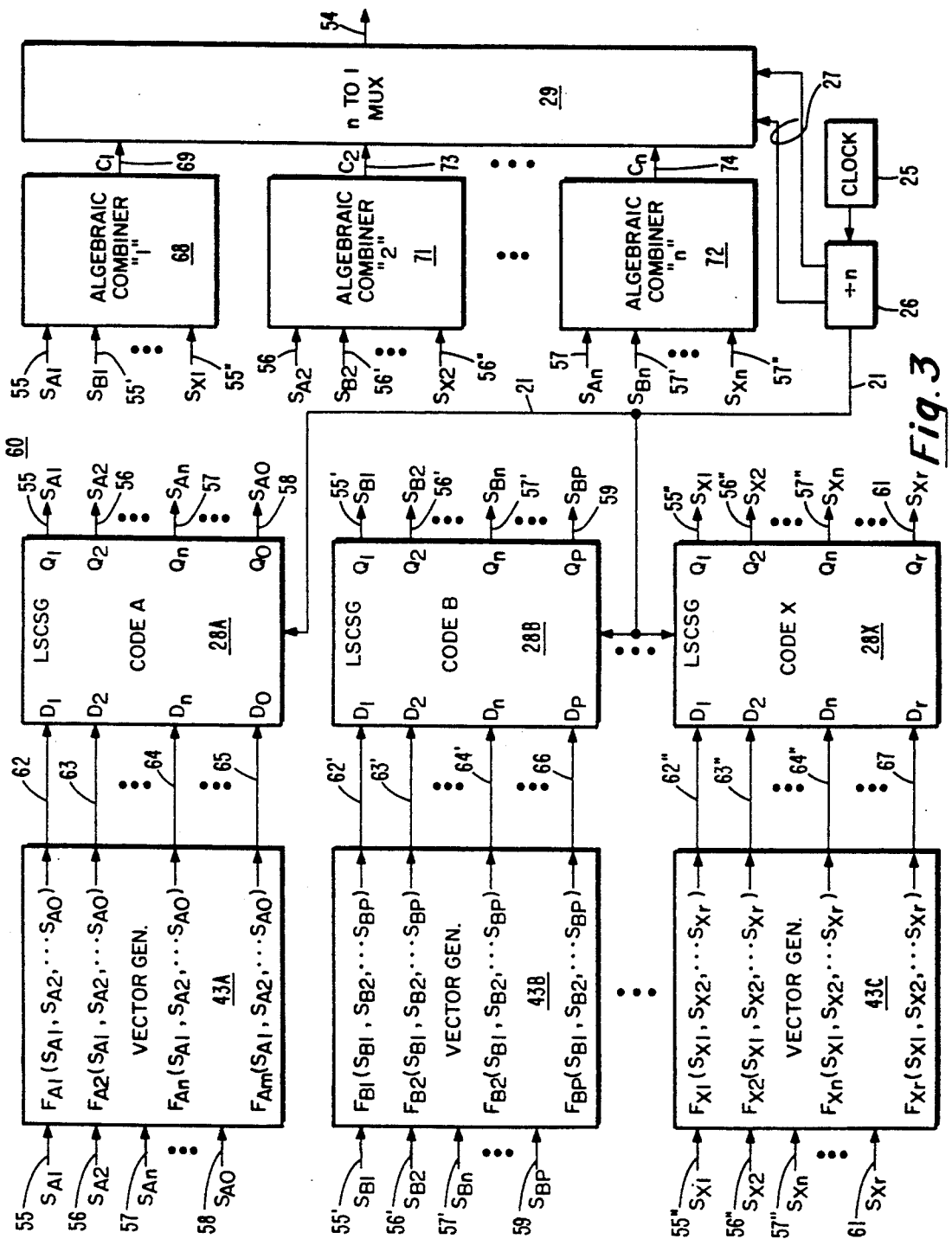
FIG. 3 is a schematic block diagram of a preferred embodiment system for generating high speed composite PN code sequence signals.

Refer now to FIG. 3 which is a schematic block diagram of a preferred embodiment high speed composite code sequence generator 60. The composite code sequence generator employs the logic elements explained hereinbefore with regard to FIG. 2. The low speed code sequence generator 28A is similar in function to the low speed code sequence generator 28 shown and described in FIG. 2. The length of the code "A" is defined by the number of flip-flops in the low speed code sequence generator 28A shown as O. The outputs from generator 28A on lines 55 to 58 are shown as vector states $S_{A1}$, $S_{A2}$, $S_{An}$ and $S_{AO}$, respectively. The number of outputs represented by $S_{A1}$ to $S_{An}$ could be any number of outputs as explained hereinbefore but are preferably four, eight or sixteen outputs. The purpose for showing the output $S_{AO}$ on line 58 is to represent that a very long code sequence can be produced which is greater than the number n. The vector states on output lines 55 to 58 are recirculated back to the inputs of the low speed code sequence generator 28A via the vector generator 43A as explained hereinbefore. The EXCLUSIVE OR functions produced at the output of vector generator 43A on lines 62 to 65 are shown as mathematical representations opposite the output lines 62 to 65. The mathematical representations shown opposite lines 62 to 65 represent the next vector state to be applied to the data inputs $D_1$ through $D_O$ of the low speed code sequence generator 28A. The clock input signal on line 21 from the divide by n circuit 26 when applied to sequence generator 28A causes the EXCLUSIVE OR function present on output lines 62 to 65 to be clocked to the output lines 55 to 58. The vector generator 43A derives an advancement in the vector sequence states which is an advancement of n number of states. Thus, the clock signal on line 21 advances the vector states on lines 55 by n number of vector states at each clock signal.

As explained hereinbefore, in order to produce a composite code, it is necessary to combine individual codes of relative prime length. The low speed code sequence generator 28B generates code "B" having a code length which corresponds to the number of flip-flops designated or indicated by P flip-flops and the $Q_P$ output on line 59 from the highest order flip-flop of generator 28B. Further, the number of flip-flops indicated by the designation P or $Q_P$ is different from the number of flip-flops represented by the designation O or $Q_O$ in generator 28A. The output lines from generator 28B have been numbered 55', 56' and 57' to correspond to the numbering of the outputs and flip-flops in generator 28A. The outputs from generator 28B are returned to the input of the generator 28B in a manner similar to that described with reference to generator 28A above. The EXCLUSIVE OR functions on the input lines 62', 63', 64' and 66 also advance the output vector states of generator 28B by the same number of vector states n when clocked by the clock pulses on line 21 as explained hereinbefore.

The low speed code sequence generator 28X generates a code "X" which has a different length from that produced by generators 28A and 28B. The code length of code X is represented by the number of flip-flops r or $Q_r$ in generator 28X. The EXCLUSIVE OR functions being presented on input lines 62'', 63'', 64'' and 67 are advanced the same number of vector states n as generators 28A and 28B. Similarly, the outputs from generator 28X on lines 55|, 56'', 57'' and 61 are recirculated back to the input of generator 28X via vector generator 43X as explained hereinbefore. It will be understood that the number of individual codes produced by the individual code generators 28A, 28B and 28X are not limited by the three shown but may be any number even though for the majority of practical applications, the number of generators will be three, four or five.

Algebraic combiner 68 is shown having three input lines 55, 55' and 55'' indicative of one input from each of the low speed code sequence generators 28A, 28B and 28X. The algebraic combiner 68 performs a logic function to produce a composite code C1 on output line 69. Similarly, algebraic combiners 71 and 72 produce composite codes $C_2$ and $C_n$ at their output lines 73 and 74 which are combined in multiplexer 29 to provide a high speed composite code output on line 54. The length of the composite code on line 54 is the product of the lengths of the individual codes A, B and X being produced by the low speed code sequence generators 28A, 28B and 28X. It will be understood that the composite codes C1, C2 and C are segments or portions of the complete composite code being produced on output line 54 and are advanced one vector state from the previously combined portion of the combined code.

The portion of the composite code on lines 69, 73 and 74 are being produced at the same low speed rate as the outputs from code generators 28A, 28B and 28X and when combined in multiplexer 29 provide a complete high speed composite code on output line 54.

Having explained a preferred embodiment of a high speed composite code sequence generator. It will be understood that a large number of low speed code sequence generators may be employed to produce a high speed code which is only limited by the speed of the multiplexer 29 which is inherently a fast logic device. Algebraic combiners 68, 71 and 72 are operating at relatively low speeds similar to the low speed code sequence generators and merely perform AND/OR logic functions on the input signals in a manner similar to the vector generators so that the limiting factor is the speed of the logic function of the multiplexer.

Having explained a preferred embodiment high speed composite code sequence generator, it will be understood that very long high speed codes can be produced having pseudonoise properties which would ordinarily require very long acquisition times but due to the composite nature of the codes which comprise the very long high speed code they may be rapidly acquired in a manner which is dependent on the sum of the independent individual codes each of which are much shorter in length than the composite code.

A feature of the present invention is the ability to produce all individual codes at low speeds and to multiplex the codes together to produce either individual high speed codes or composite high speed codes employing novel and improved low speed code sequence generators.

I claim:

1. A high speed code sequence generator for generating pseudo random spread spectrum codes comprising:
   a high speed clock,
   a divide by n circuit coupled to said high speed clock,
   a plurality of low speed code sequence generators coupled to said divide by n circuit,
   each said code generator providing as an output a sequential set of vector states,
   each said code generator having a different length PN code,
   each said PN code being relatively prime in length to the code of the other code generators of said plurality of code generators,
   a vector generator coupled in series between the output and the input of each low speed code sequence generator,
   a plurality of algebraic combiners each having as an input the same vector state of each of the outputs of the low speed code sequence generators,
   a multiplexer for multiplexing the outputs of said algebraic combiners into a serial high speed composite code sequence providing a PN code epoch length which is the product of the lengths of the individual PN codes of said low speed code sequence generators.

2. A high speed code sequence generator as set forth in claim 1 wherein said multiplexer is coupled to said high speed clock.

3. A high speed code sequence generator as set forth in claim 1 wherein said plurality of algebraic combiners are n in number.

4. A high speed code sequence generator as set forth in claim 1 wherein the outputs from each said vector generator are coupled to the inputs of its associated low speed code sequence generator to provide the next sequential set of output vector states from said low speed code sequence generator.

5. A high speed code sequence generator as set forth in claim 4 wherein each said low speed code sequence generator comprises a plurality of flip-flops in parallel.

6. A high speed code sequence generator as set forth in claim 4 wherein said output from said vector generator comprise algebrgic combinations of said output vector states of said associated low speed code sequence generator.

7. A high speed code sequence generator as set forth in claim 4 wherein each said output from said vector generator is an algebraic combination of one or more output vector states from said associated low speed code sequence generator.

8. A high speed code sequence generator as set forth in claim 4 wherein said outputs from said vector generator are an EXCLUSIVE OR combination of the plurality of said output vector states of said associated low speed code sequence generator.

9. A high speed code sequence generator as set forth in claim 8 wherein said vector generator is adapted to advance said sequential set of said vector states by a predetermined number of vector states.

10. A high speed code sequence generator as set forth in claim 8 wherein said vector generator is adapted to advance n vector states where n is an integer equal to or greater than two.

11. A high speed code sequence generator as set forth in claim 9 wherein said vector generator is adapted to advance said sequential state of vector states by eight.

12. A high speed code sequence generator for generating spread spectrum codes comprising:
    a high speed clock;
    a divide by n circuit coupled to said high speed clock;
    a low speed code sequence generator coupled to said divide by n circuit;
    said low speed code sequence generator having a plurality of vector state outputs representative of a sequential set of vector states;
    a vector generator having its inputs coupled to the outputs from said low speed code sequence generator;
    said vector generator having its outputs coupled to the input of said low speed code sequence generator, and
    a high speed multiplexer coupled to said high speed clock and to said low speed code sequence generator for producing an individual high speed code at the output.

* * * * *